Oct. 16, 1928.

G. MANIERRE 1,687,841

POWER OPERATED PORTABLE LOADER

Filed Dec. 19, 1924   9 Sheets-Sheet 1

Inventor
George Manierre
Daniel F Brennan
Attorney

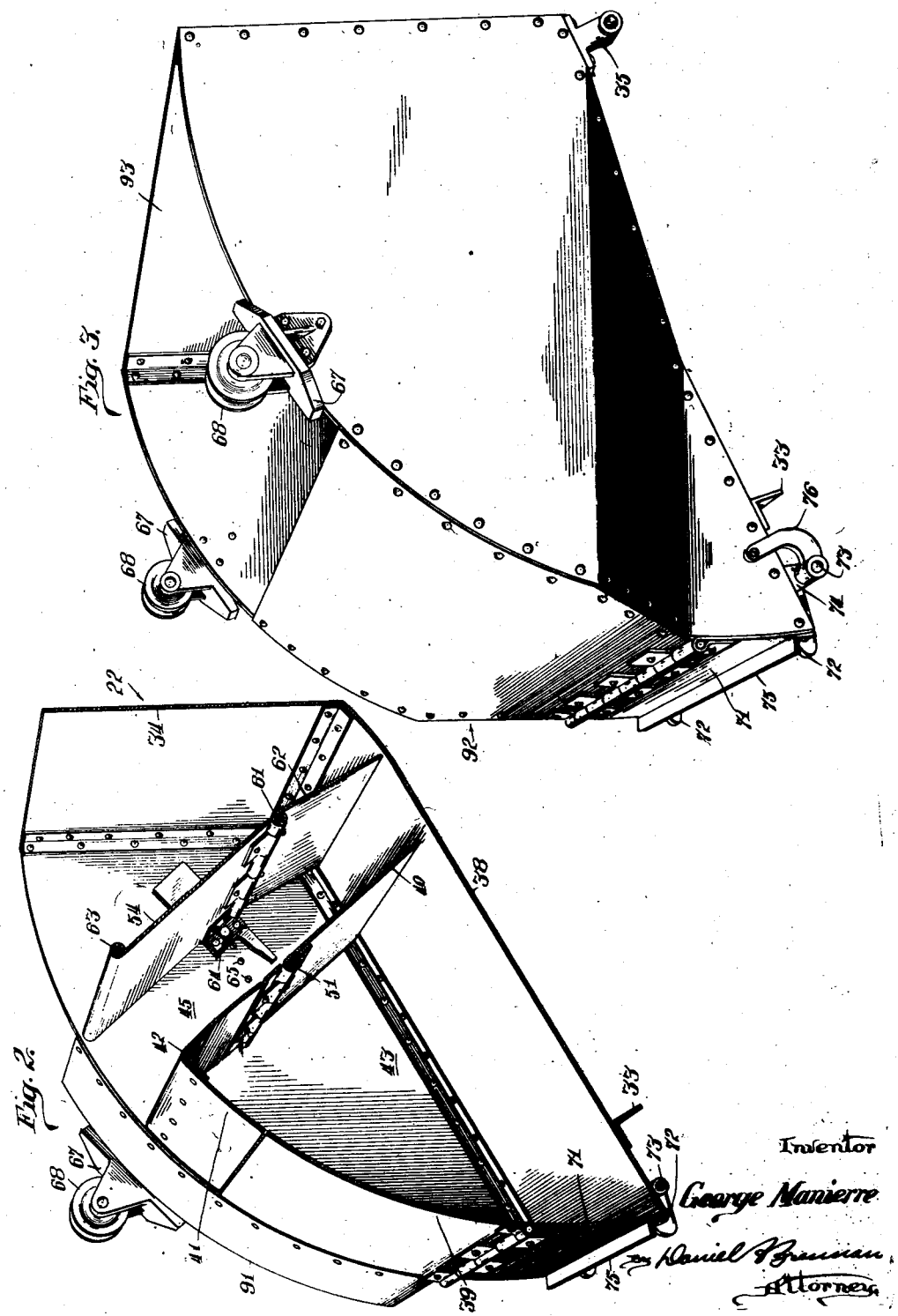

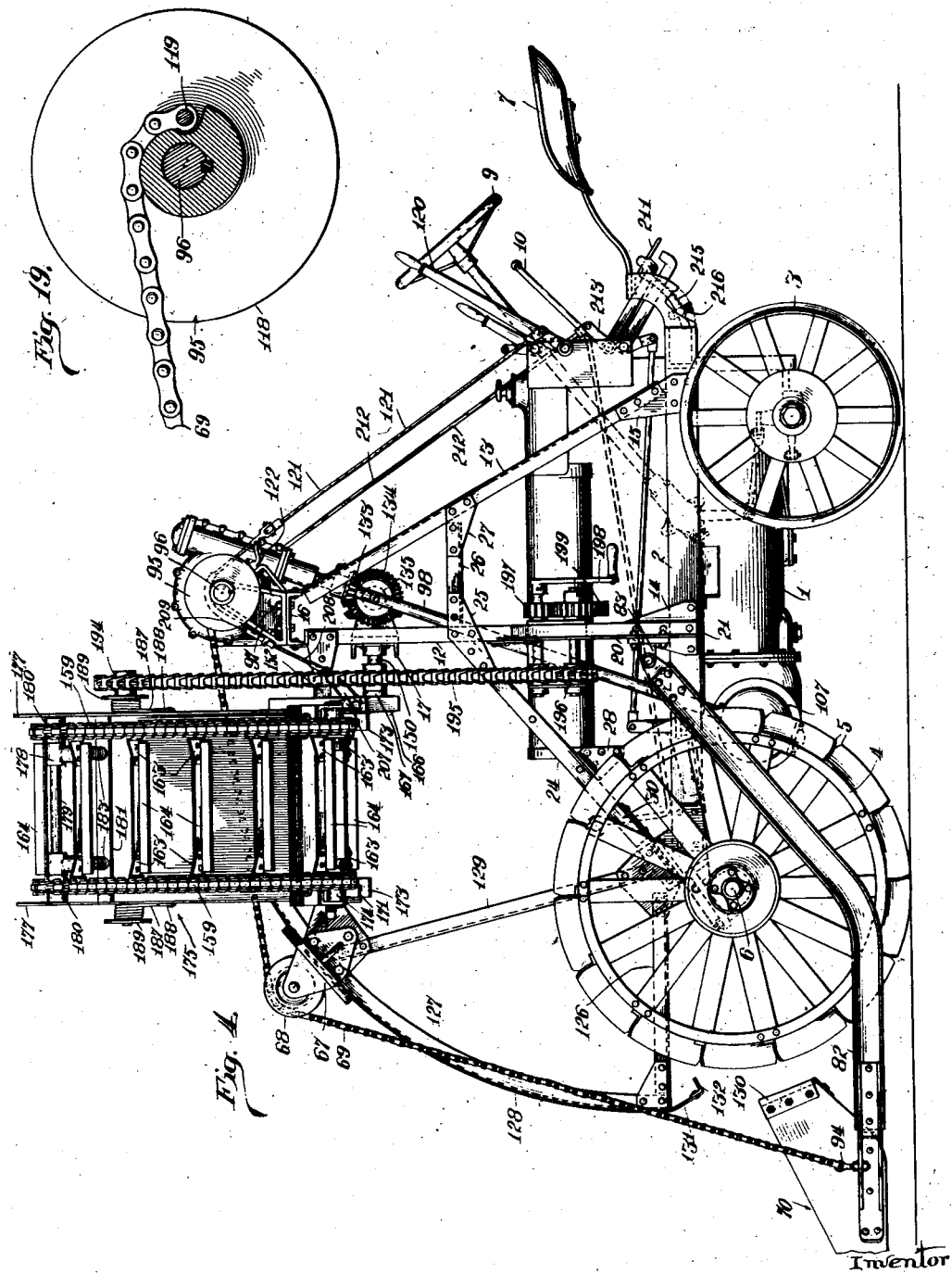

Oct. 16, 1928.  
G. MANIERRE  
1,687,841  
POWER OPERATED PORTABLE LOADER  
Filed Dec. 19, 1924  9 Sheets-Sheet 4
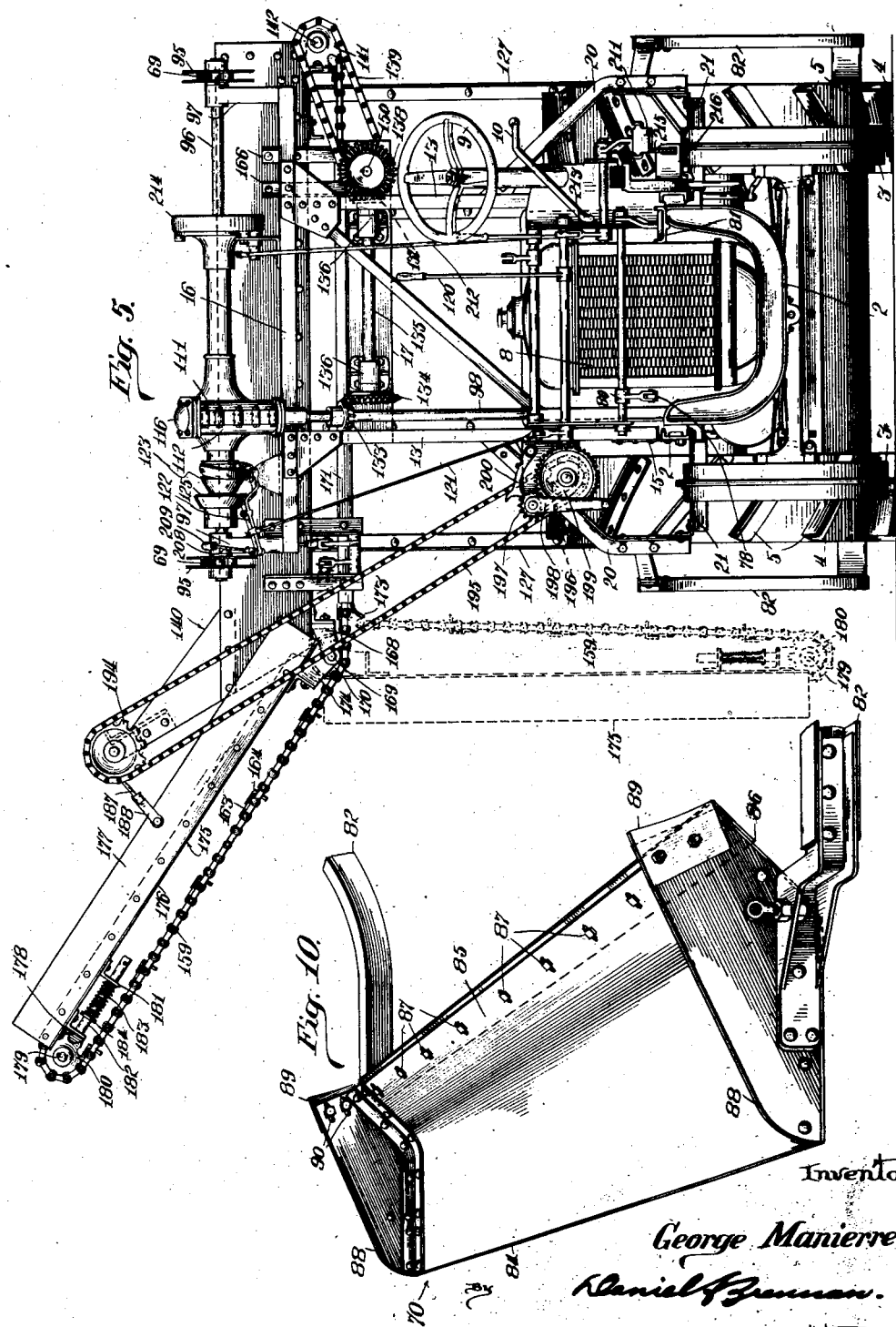

Oct. 16, 1928.
G. MANIERRE
1,687,841
POWER OPERATED PORTABLE LOADER
Filed Dec. 19, 1924    9 Sheets-Sheet 5
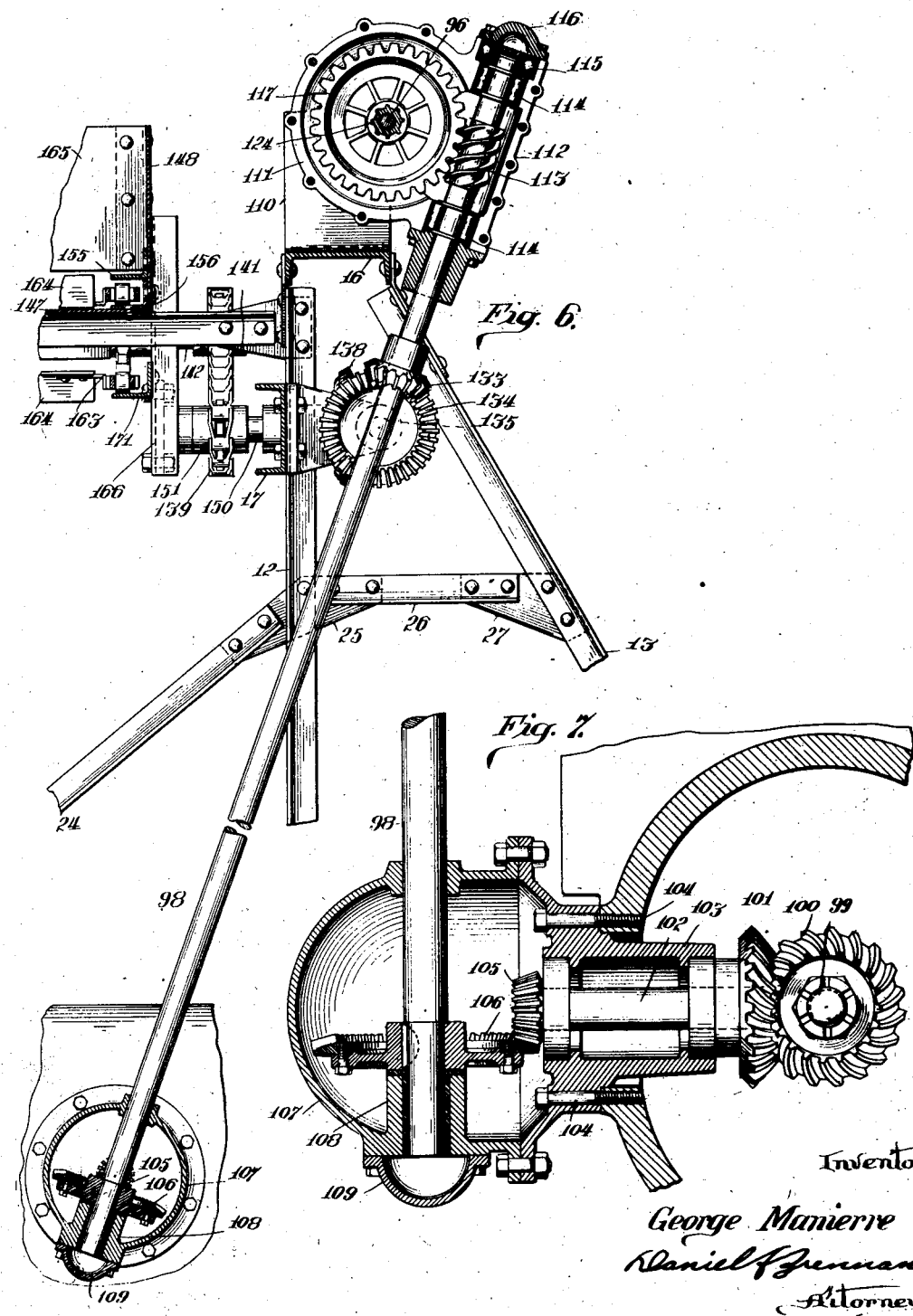

Oct. 16, 1928.
G. MANIERRE
1,687,841
POWER OPERATED PORTABLE LOADER
Filed Dec. 19, 1924    9 Sheets-Sheet 6
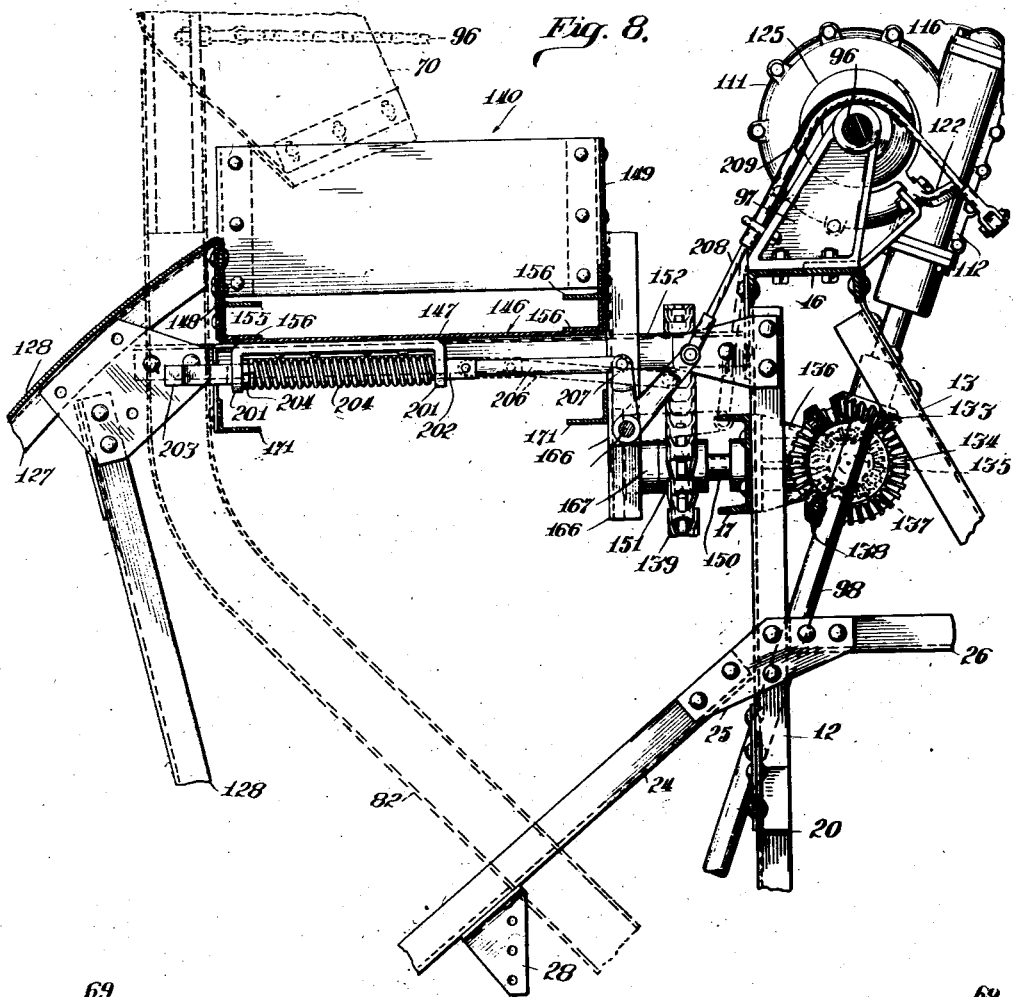
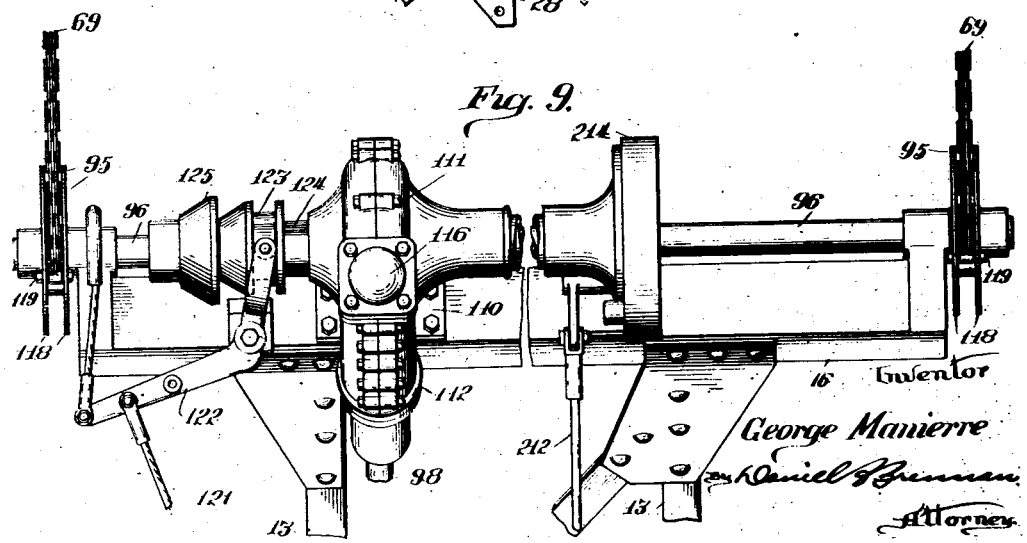

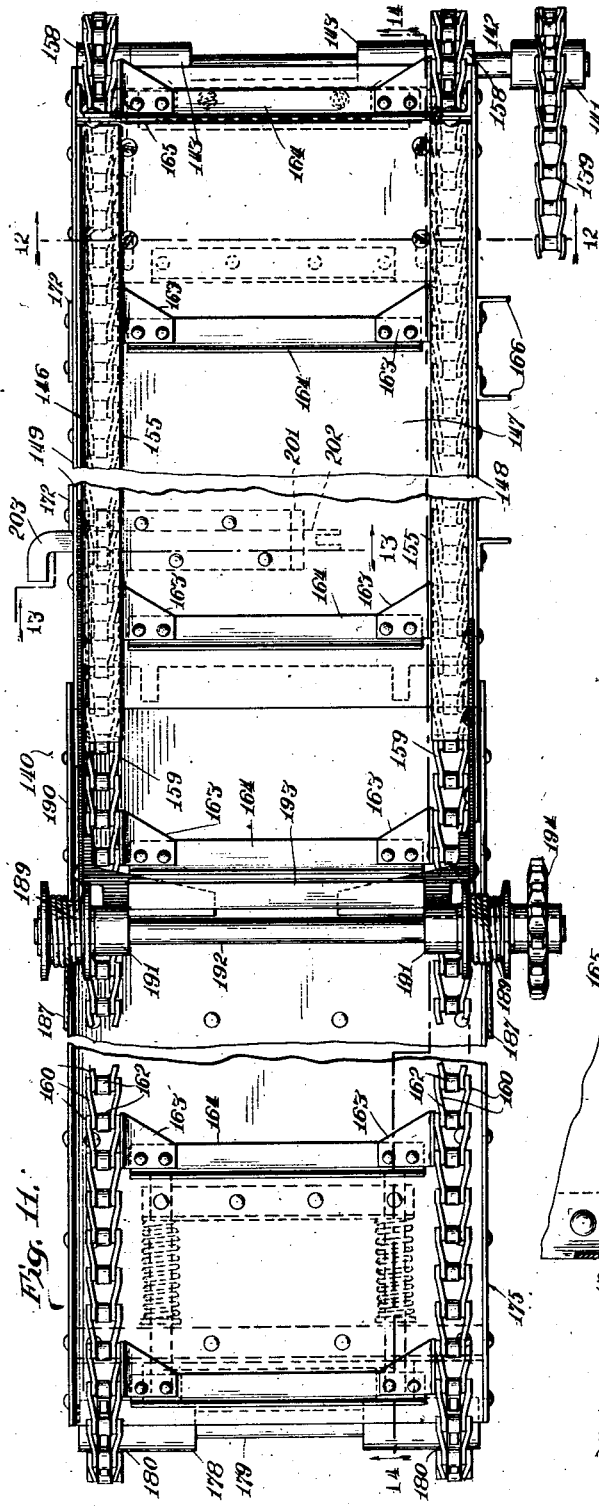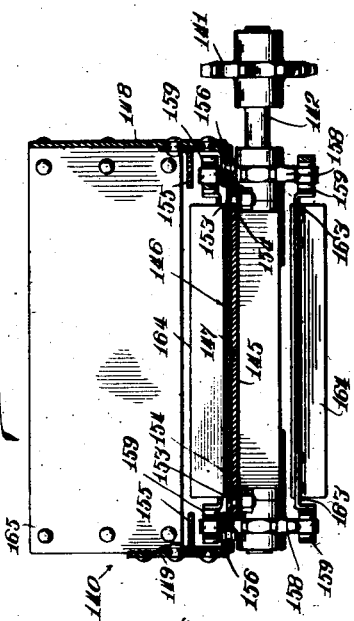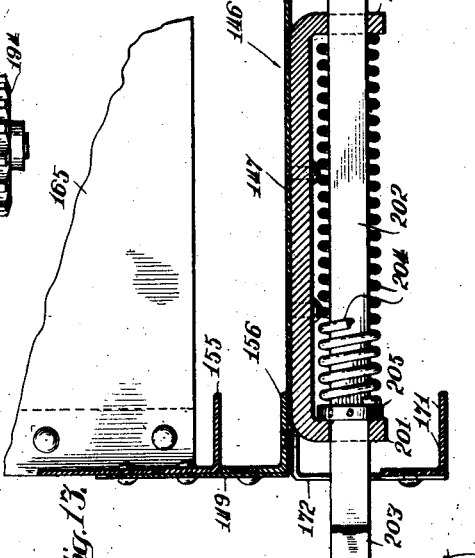

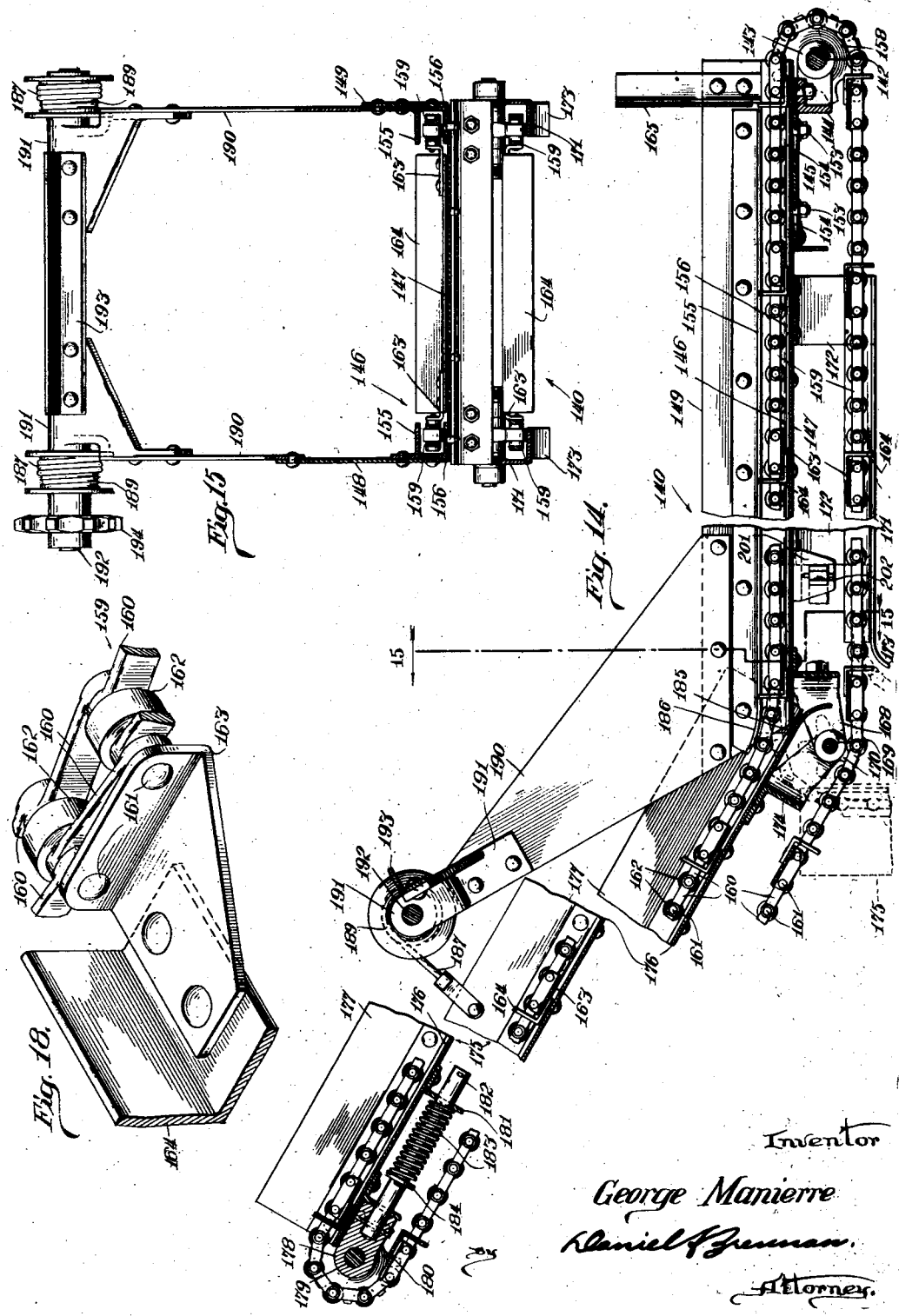

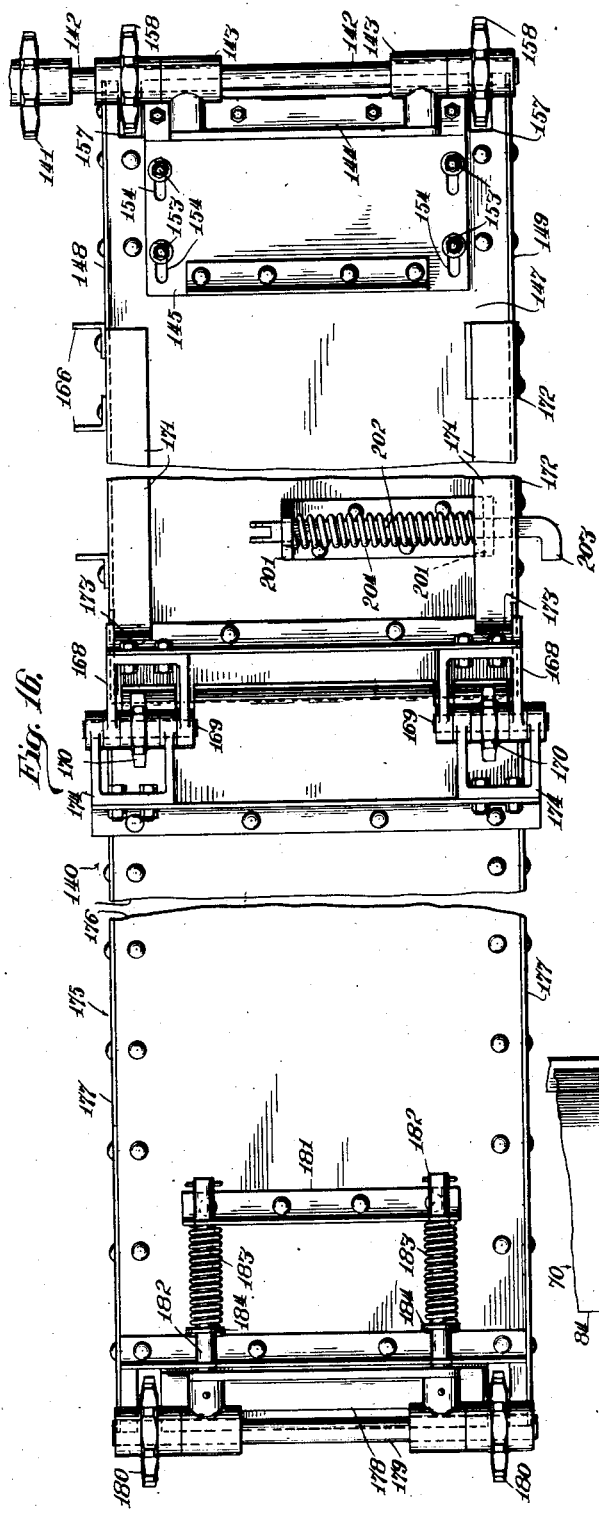

Patented Oct. 16, 1928.

1,687,841

UNITED STATES PATENT OFFICE.

GEORGE MANIERRE, OF MILWAUKEE, WISCONSIN.

POWER-OPERATED PORTABLE LOADER.

Application filed December 19, 1924. Serial No. 756,943.

This invention relates to improvements in power operated portable loaders.

It is an object of the invention to provide a power operated portable loader suitable for transferring a relatively heavy load in a box which is secured to the chassis of a tractor and to also effect the loading of this box by means of the engine propelling the tractor.

It is furthermore an object of the invention to provide a power operated portable loader in which not only the charging of the loader box may be effected by the engine propelling the tractor, but in which also the proportions of ingredients of the charge may be selectively determined and may be carried in different compartments so as to remain separated until delivered to the point of use.

The invention also has the object of providing improved control means for a hoisting device which is operated by the propelling engine of the tractor to retain the charging operation of the loader box entirely under the supervision of the driver or operator.

The invention also has the object of combining an improved conveyor device with a tractor and loading device, this conveyor also being operated by the engine propelling the tractor and being under the control of the driver.

Another object of the invention is to provide in a power operated portable loader automatic means for controlling the charging device through which a load is transferred from the ground to a conveyor so as to interrupt the operation of the charging device when the latter is in a position to deliver the load carried by it to the conveyor.

It is also an object of the invention to provide a charging bucket adapted to produce a path for the wheels of the tractor so as to facilitate the continued advance of the machine into the material to be charged.

Another object of the invention is to provide an improved conveyor construction particularly suitable for transportation on a tractor and to render this conveyor construction adjustable for transferring quantities of material in a relatively uniform manner to a delivery point to which the conveyor may be properly adjusted.

The invention also has the object of providing a conveyor construction wherein several sections of the conveyor frame may be folded relatively to each other to reduce the space which the conveyor will occupy when not in use, and to render the entire structure compact when the power operated portable loader travels from one place to another.

With these and numerous other objects in view, a plurality of embodiments of the invention is illustrated in the accompanying drawings, wherein:

Fig. 2 is a perspective sectional view to illustrate the interior of the batch loader box.

Fig. 3 is a perspective view of the loader box which is not divided into compartments.

Fig. 4 is a side elevation of a modified loader, certain of the parts being shown broken away for the sake of better illustration.

Fig. 5 is a front elevation of the machine shown in Fig. 1, the driver's seat being omitted in this view for the sake of better illustration.

Fig. 6 is a sectional view and side elevation of the driving arrangement for the various forms of loader shown in Figures 1 and 5 and shown on a larger scale.

Fig. 7 is a detail sectional view of the transmission elements.

Fig. 8 is a side elevation and partly sectional view of an automatic clutch release for interrupting the loading movement when the loading shovel has reached a predetermined elevation.

Fig. 9 is a front elevation of a jack shaft controlling the movement of the loading shovel.

Fig. 10 is a perspective view of an improved loading shovel.

Fig. 11 is a top plan view of the conveyor and its frame for the wagon loader.

Fig. 12 is a section through the slat conveyor on line 12—12 of Fig. 11.

Fig. 13 is a similar sectional view thru the slat conveyor on line 13—13 of Fig. 11.

Fig. 14 is a longitudinal section thru this conveyor on line 14—14 of Fig. 11.

Fig. 15 is a transverse section through the slat conveyor on line 15—15 of Fig. 14.

Fig. 16 is a bottom plan view of the trough of the slat conveyor and its hinge for adjusting it to different positions.

Fig. 17 is a top plan view and partly section illustrating the suspension of the shovel in relation to the frame and wheel of the tractor.

Fig. 18 is a perspective view of conveyor details, and

Fig. 19 is a detail section through a chain drum.

Figure 1:
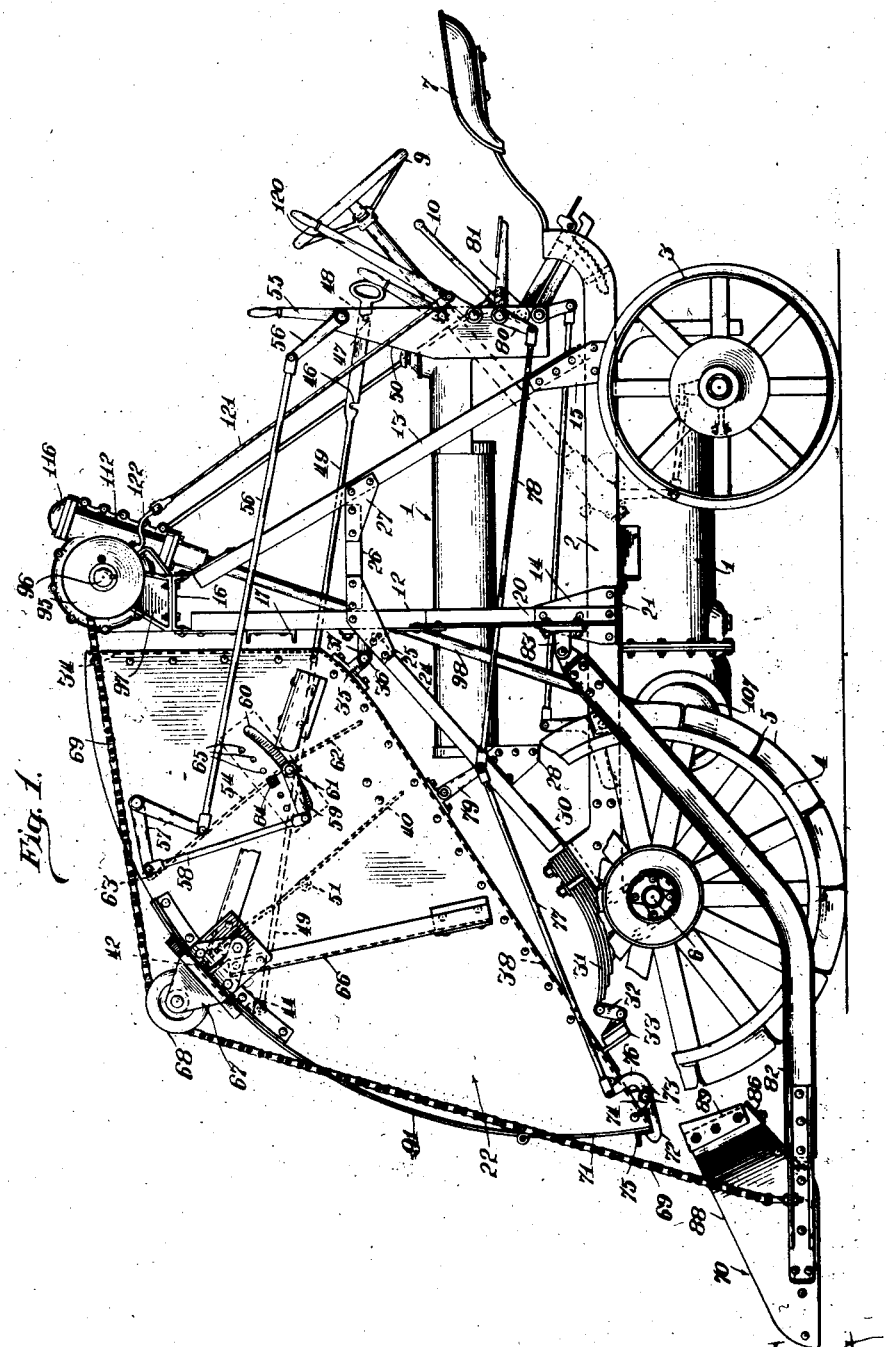
Fig. 1 is a side elevation of the complete machine.

In these drawings the machine is shown as comprising a tractor of the type commonly known as Fordson tractor, although obviously other tractors or engines may be used. The power on the tractor consists of an internal combustion engine indicated conventionally at 1, supported by a frame 2. The frame 2 is supported by a set of wheels 3 and by another set of wheels 4 preferably of larger diameter and equipped with ground gripping shoes 5 which, however, may be omitted.

While in the ordinary Fordson or other tractors the smaller wheels 3 are the front wheels, the position of the parts is reversed in the present application, the transmission between the crank shaft (not shown) and driving axle 6 containing a left hand worm instead of the customary right hand worm in the differential drive, to propel the tractor in a direction opposite to that in which the power plant of the standard tractor propels the vehicle. It is for this reason that the operator's position, as indicated by the seat 7, is located on what now forms the rear end of the modified tractor, where it faces the radiator 8, Fig. 5, while the weight of the machine is thereby placed on the front axle which is adequately provided with bearings to support the load.

The steering device controlled by the steering wheel 9 at the operator's station is approximately the same as in the standard device, the steering wheels being the smaller wheels 3 which ordinarily constitute the front wheels of the tractor and which in the present modification form the rear wheels of the same. The gear shift lever 10, brake pedal and other elements forming parts of the tractor equipment are the same as in standard tractors.

For the purpose of supporting on a tractor of this character a loader either of the form shown in Figs. 1 and 2 or of the form shown in Fig. 3, and the mechanism for imparting the necessary movements to a loader shovel a superstructure is erected upon the chassis 2 of the tractor. This superstructure comprises the uprights 12 and braces 13 which are secured to the longitudinal sills of the chassis by means of the plates 14 and 15 respectively, and which are united on top by a transverse beam 16 which not only connects the uprights 12 and 13 on each side but also serves for uniting the superstructure parts 12, 13 on one side with those on the other side of the chassis. An additional transverse beam 17 located beneath the transverse beam 16 extends from the uprights 12 on one side to those on the other side of the structure. Additional struts 20 in the form of bent angle irons are secured at their foot ends to extensions 21 of the lateral sills of the frame; they connect with the uprights 12 in order to brace the latter and to impart the necessary rigidity to the entire superstructure. Auxiliary inclined struts 24 united with the uprights 12 by means of plates 25 extend to the opposite end of the chassis. The uprights 12 and 13 are also connected on each side by a bar 26 attached to plate 25 and to a plate 27. The lower portions of the struts 24 are secured to brackets 28 in the form of angle plates, or the like, fastened to the rear end of the combustion engine, and the extremities of the struts 24 rest on a supporting bracket 30 for the springs 31. The springs terminate in shackles 32 through which the connection with a transverse beam 33 near the front end of the box 22 is firmly established. The rear end of the box has a plurality of brackets 35 adapted to support a rod 36 which is secured in bearings 37 extending rearward of the superstructure formed by the uprights 12.

The box 22, as shown in Fig. 2, consists of a rear wall 34, a bottom 38 and a curved front wall 39 which is extended to a portion only of the top so as to leave openings through which material may be delivered into the box by a charging shovel. The various wall portions are rigidly secured to each other by means of angle irons or the like.

In order to divide this box into a plurality of compartments adapted to receive sand and stone respectively or other materials, partition walls are located within the interior of the box. Certain of these partition walls are adjustable with respect to other walls of the box to vary the capacity of the different compartments, and some partition walls are adjustable under the control of the operator to selectively prevent material of one sort from being discharged by the shovel into certain compartments.

A gate of angular cross-section as indicated at 41, is oscillatably supported on a transverse rod 42, and as shown in Fig. 2 closes the front compartment 43 against delivery of material. When it is desired to fill this compartment, the gate 41 is turned about its pivotal support 42 into a position different from that indicated in Fig. 2, whereby that portion of the gate shown in said figure as forming substantially a continuation of the front wall 39, is swung downwardly into the box while the other portion will be placed into a position to cover the charge opening for the adjacent compartment 45.

For the purpose of effecting this adjustment under the control of the operator the free end of the rod 42 is connected by means of an arm 44 located on the outside of the box and shown in dotted lines in Fig. 1 with a rod 49 extending towards the driver's position. That portion of the rod 49 which is near the driver's seat is enlarged to form a flat bar having notches 46 and 47. In the position indicated in Fig. 1 the notch 47 is in engagement with a pin 48 projecting from a bracket 50 which is secured to the front portion of the machine and which bracket serves for the attachment of additional manipulating levers and fixtures. The rod 49 may be adjusted longitudinally subsequent to the release from the locking pin 48 until the notch 46 is adapted to be locked by engagement with the same pin 48. Another portion of this partition wall, as indicated at 40 is adjustable about a pivot 51 to vary the contents of the respective compartment. This second movable portion of this partition wall may be held in adjusted angular position by a pin 52 (Fig. 1) insertable through one of several openings 50 provided in the side wall of the box. When it is desired to load the second compartment with material different from that placed in the first compartment the gate 41 is placed into the position shown in Fig. 1. If the second compartment should be filled, the surplus stone carried by the shovel will not flow back to the stone pile, and the shovel therefore will scrape the stone across the opening of this second compartment into the last or third compartment of the box.

A gate also is provided at 54 for this second compartment 45, and this gate may be adjusted manually from the driver's seat by means of a plurality of links and levers, as shown in Fig. 1. A control lever 55 pivoted on the bracket 50 secured to the front portion of the machine is connected with a link 56 extending to a bell crank lever 57 which is secured to the outside of the box 22. One arm of this bell crank lever is joined by link 58 with an arm 59 which projects from the gate 54 through a slot 60 in the wall of the box 22. The arm 59 is fixed to a transverse bar 61 from which a lower flap 62 extends from gate 54 downward towards the bottom of the box, the gate composed of the flaps 54 and 62 being movable about the pivot bar 63 near the upper end of the box.

Similar to the adjusting arrangement described in connection with my United States Patent No. 1,506,762, an arbitrary adjustment of the limit of contents of the second or stone compartment 45 may be effected through bolt 64 which may be inserted into any one of several openings 65 in the wall of the box to prevent excessive forward movement of the gate portion 54.

As shown in Fig. 1, lateral reinforcing bars 66 are provided on the outside wall of the box and serve for supporting near the top thereof brackets 67 on which rollers 68 for the guidance of the elevating or hoisting chains 69 of the charging device 70 are secured.

The operator may at his selection uncover the first or sand compartment 43 so as to make possible the charge of suitable material into the same, and to prevent the same from being delivered into the second or stone compartment 45, as the latter is automatically closed when the first compartment is opened and vice versa. He may also cover the stone compartment to cause material to be scraped by the charging shovel 70 over the top closure of the stone compartment into the third compartment of the batch loading box. He also may adjust the size of these compartments within wide limits to prepare batches of varying weight, or in which the ingredients may be variably proportioned.

The box 22 is, furthermore, provided with a closure plate 71 near the bottom of the front wall 39 through which the discharge of the material deposited in the box to a suitable concrete mixer or the like (not shown in the drawing) may be effected, after the tractor has transported this material in the batch box from the point of supply to the point where these materials are to be used. This gate 71 is normally retained in closing position by a latch device comprising one or more hooks 72 which are rigidly connected with a transverse bar 73 rotatably supported in bearing brackets 74 projecting from the bottom wall 38 of the box 22. These latch hooks engage a reinforcing bar or angle iron 75 at the free edge of the gate 71 to retain the same in closing position. In order to move the latch hooks 72 to release position, when it is desired to discharge the material, a crank 76 is secured to the end of the bar 73 and is with a link 77 continued to the driver's position by means of an additional link 78, the two links being in movable connection at their adjacent ends with an arm 79 which is pivotally mounted near one side wall at the bottom wall of the box. The opposite end of the second link 78 is connected to an arm 80 pivoted on the bracket 50, and this pivotally mounted arm is fixed to a treadle lever 81 under the control of the operator, whereby upon depression of said treadle the latch hooks 72 will be swung counter-clockwise to release the gate 71.

Owing to these control devices the operator is empowered to charge the different compartments successively; he is in position to vary the capacity of the compartments and he may discharge the entire batchloader box at any time.

In order to transfer the charge from the point of supply, which is usually a heap of material located on the ground, a shovel 70 or bucket is used which is fixedly connected with arms 82 extending to bearing brackets 83 mounted on the upright structure which forms a part of this tractor attachment.

The shovel 70, as illustrated in Fig. 10, is open at the top and the front or digging edge 84 is wider than the rear wall 85 so as to impart to the entire bucket a tapering shape, the rear wall being adjustable in height by means of an additional bar 86 held in variable relation to the fixed portion of the wall by a plurality of bolts 87 which extend through elongated slots in the fixed portion of the rear wall. Owing to the enlarged front or digging edge of this bucket the shovel or bucket upon being advanced by the tractor into the heap of material spread on the ground, will produce a path for the front wheels 4 of the tractor to facilitate the continued advance of the entire machine into this material.

It is furthermore apparent from Fig. 10 that at the side walls 88 of the bucket 70 brackets or plates 89 are adjustably secured by means of bolts extending through elongated slots 90 in said side walls, the rear edges of the brackets or plates 89 being curved on a radius substantially equal to the radius of the curved front wall of the batch loader box 22, as shown in Figs. 1 and 2, or of the loader box, as shown in Fig. 3. The plates 89 are adapted to travel during the movement of the bucket 70 on a path adjacent curved plates 91, as indicated in Fig. 2, which are riveted or secured in some other suitable way to the outer walls of the box. Owing to this provision of plates 89 on the bucket and the curved plates 91 on the box the large gap between the bucket and the face of the box will be closed.

The loader box 92 illustrated in Fig. 3 is similar to the box 22 of Fig. 2 and is supported on the tractor exactly as described with reference to box 22. It is not provided, however, with partition walls, but has one large opening 93 near the edges of which the roller brackets 67 are secured.

The hoisting and lowering of the bucket 70 is effected by means of the chains 69 having their lower ends secured to eye-bolts 94 which are fastened into the front ends of the arms 82. The other ends of the chains 69 are secured on drums 95 which, as shown in Figs. 1, 4 and 5, are mounted near the ends of a transverse shaft 96 rotatably carried in bearing brackets 97 fixed to the transverse beam 16 near the top of the superstructure. This transverse shaft 96 receives its drive from the engine of the tractor through a slantingly disposed drive shaft 98, the details of the transmission being illustrated in Figs. 6, 7, 8, 9 and 19.

The engine shaft 99 or another shaft driven by the engine carries at its rear end a helical bevel pinion 100 which is fixedly held in place on said shaft by means of a castellated nut. This helical bevel pinion is in engagement with a similar pinion 101 mounted on the end of a jack shaft 102 supported in bearings which are inserted into a tubular casting 103 secured by means of screws to the crank or engine casing, a portion of which is shown in Fig. 7 at 104. This countershaft 102 carries at the opposite end a bevel gear 105 in driving engagement with a bevel gear 106 of somewhat larger diameter fixed near the lower end of the intermediary driving shaft 98, which extends in slanting direction from the lower end of the engine to the top end of the superstructure. The bevel gear transmission 105, 106 is inclosed in a casing 107 bolted to the first named tubular casting 103 in which the jack shaft 102 is mounted. This casing 107 also is provided near its lower end with an inwardly projecting box finished to serve as a bearing 108 in which the foot portion of the shaft 98 is rotatably supported, the entire structure being so arranged that a lubricant may be introduced into these casings to permit the gears to turn freely and permanently in the lubricant. A discharge of the lubricant from the casing 107 is prevented owing to the provision of a bowl 109 secured to the lower flattened portion of the said casing.

The transverse I-beam 16 which tops the superstructure serves for supporting intermediate its ends a bracket 110 to which another casing 111 for receiving a worm transmission is secured. This worm gear casing 111 preferably is composed of two similar parts held in operative assembly by bolts and the casing parts are preferably integral with an extension 112 through which the top portion of the secondary shaft 98 projects, said shaft carrying within the extension 112 a worm 113 rigidly fixed to the shaft 98. This top portion of the secondary shaft is supported, as shown in Fig. 6, by means of roller bearings 114 inserted into the extension 112, and a thrust ball bearing 115 is disposed between the uppermost roller bearing 114 and a closure cap 116 secured to the extension. The worm on the secondary shaft is in permanent engagement with a worm gear 117 loosely secured to the transverse shaft 96 and inclosed in the casing 111 which also may be filled with a lubricant to assure a noiseless and smooth operation of this transmission.

The ends of the transverse shaft 96 which is driven through the secondary shaft 98 carry the narrow chain drums 95 having the shrouds or plates 118, Fig. 19, by means of which the proper winding operation of the hoisting chain on each drum is assured. As shown in Figs. 9 and 19, a bolt 119 passing in axial direction through the drum and through the shrouds thereof serves as an attachment device for the end of the hoisting chain. The drum as illustrated in Fig. 19, is not coaxial with the shaft but is eccentrically related thereto. Owing to this arrangement the leverage for initiating the hoisting movement is more efficient; the effective diameter of the drum increases gradually until the chain hugs a portion of the drum the radius of which is equal to the initial radius increased by the thickness of the chain link, whereupon the winding of this chain on the drum is continued. The operation of the hoisting mechanism described may be interrupted without stopping the engine or even without stopping operation of the shaft 98 by the following means.

When the bucket is to be raised to the charging position for the box 22 or 92, the operator grasps the lever 120 which is arranged near the driver's seat and by swinging the lever downward he exerts a pull on the rope 121 secured to the lever. The other end of the rope is attached, as shown in Fig. 9, to a bell crank 122 fulcrumed on a bracket on the transverse beam 16 which unites the uprights of the superstructure. The lever 122 is bifurcated at one end, and partly embraces a clutch member 123 which is secured by a splined connection (not shown) to the hub extension 124 of the worm gear 117. A swinging movement of this lever 122 in a direction produced by a pull on the rope 121 will force the sliding clutch member 123 to the left, Fig. 9, thereby bringing it into operative frictional engagement with a companion clutch member 125 which is keyed to the transverse shaft 96 to drive the same and thereby also the chain drums 95 in a predetermined direction.

It is obvious, therefore, that upon manipulation of the lever 120, the worm transmission 113, 117 while being permanently operated, will transmit the rotary movement to the shaft 96 only upon the clutch 123 being moved to operative engagement. Upon release of the lever 120, or upon forcibly swinging it in opposite direction, the frictional operative connection between the two clutch members 123, 125 will be interrupted so that no hoisting movement takes place. The pull exerted by the empty bucket 70 on the chains 69 will cause the shaft 96 extending transversely above the beam 16 to rotate freely in the opposite direction whereby the chains are unwound from the drums.

It is obvious, therefore, that the operator may start the hoisting movement by manipulating the lever 120 and may continue this operation, as long as he forces this lever in a predetermined direction while upon release of the lever the hoisting operation will cease, and the charging device will be lowered automatically.

In the modification illustrated in Figs. 1 and 5 to 17 inclusive the tractor is converted into a machine for combining a load hoisting device with a conveyor whereby the material carried upward in the bucket 70 is dumped onto the conveyor, from which it can be carried to a wagon or the like (not shown) to be removed to a place remote from the loading point, independent of the movement of the tractor itself.

The general construction of the tractor with the control for the hoisting device is the same as described above. Instead of having, however, a box as indicated at 22 or 92 located on the rear portion of the chassis, the latter is extended rearward by horizontal bars 126 to the end of which curved angle irons 127 are secured. The curvature of these angle irons corresponds to the path through which the bucket 70 is hoisted, said path being generally a circular arc having its center in the pivotal axis of the arms 82 to which the bucket 70 is secured. Wear plates 128 of equally curved form are secured by countersunk rivets or the like to the outer flange of these angle irons, which are also supported by the braces 129 rising from the chassis. These braces serve to support the brackets 67 for the chain sheaves 68. Adjustable lateral end plates 130 with curved edges are attached also here to the bucket 70, as shown in Fig. 1, adapted to ride upon said wear plates 128. The wear plates 128 are extended downward below the lower ends of the angle irons 127 as indicated at 131 and are reinforced at their free edge by a transverse angular bar 132 to facilitate the initial engagement of the bucket with this guiding device.

The drive of the conveyor 140 which is shown here as an ordinary slat conveyor is effected from the secondary shaft 98 carrying rigidly thereon at a distance below its top a bevel gear 133, Fig. 8, in driving connection with a bevel gear 134 at one end of a transverse jack shaft 135. This jack shaft is rotatably mounted in bearing brackets 136 which are secured on the transverse beam 17, extending between the uprights 12 on the superstructure of the tractor. The opposite end of this jack shaft also carries a bevel gear 137 in engagement with a bevel gear 138 mounted on a short shaft 150 supported in the projecting end of the transverse beam 17 and to this shaft is securely fixed a sprocket 151, Fig. 8, over which a driving chain 139 is trained. The chain also is in driving engagement with a sprocket 141 at the outer end of a transverse shaft 142 constituting the driving shaft for the conveyor.

According to Figs. 14 and 16, this shaft is supported in bearings 143 forming horizontal projections of an angle bracket bar 144, Fig. 14, securely mounted on a plate 145 which is fastened at the bottom 147 of a conveyor trough 146. The latter comprises a longitudinal side wall 148 of greater height than the opposite side wall 149, see for instance Fig. 12, the wall 148 preventing discharge of material from the conveyor towards the tractor or near side. This trough forms one stationary section of a multiple section conveyor frame. This stationary section is supported on angle irons 152 which, as shown in Fig. 8, are secured at one end to the uprights 12 and are connected at their other end with a transverse element (not shown) extending between the heads of the guide rails 127.

The plate 145 is adjustably mounted on the bottom 147, Fig. 16, so as to take up the slack in the chain by bolts 153 passing through slots 154 in the plate and extending into the bottom of the trough. The lateral walls 148, 149 of the conveyor box 146 are each provided with a pair of longitudinal angle irons 155, 156, as shown in Figs. 8, 14, 15, the angles forming a channel in which the links of the conveyor chain are guided, these angles serving at the same time for the reinforcement of the trough or conveyor frame.

The rear end of the bottom plate 147 has slots 157 for the sprockets 158 on shaft 142 over which the two link chains 159 of the conveyor are trained.

Each conveyor chain, as particularly shown in Figs. 14 and 18, comprises links 160 the pintles 161 of which support rollers 162 through which the chain rides on the lower angle irons 156 in the interior of the conveyor trough. Certain spaced links are united with angle brackets 163 which are secured to adjacent pintles by one of their flanges while the other flange is fixed to transverse angle bars 164 serving as connecting elements for the two conveyor chains and at the same time for dragging or pushing the material dumped into the conveyor trough in the travel direction of the chains.

At the rear end the trough 146 is furthermore provided with a guard plate or end wall 165, as shown in Figs. 12 and 14, which extends between the lateral walls 149, 148 of the box, and which is reinforced at its ends by upright angles riveted to these walls near their free ends. This guard plate will thereby prevent the accidental discharge of material from the rear end of the box.

A pair of angle irons 166 secured to the lateral wall 149 serves for suspending a bearing 167 in which the rear end of shaft 150 is rotatably supported, Fig. 8.

The lower portion of the conveyor chains is guided in a parallel path by means of angle irons 171 suspended by hangers 172 from the wall of the trough 146, as shown in Fig. 14. These guiding angles terminate in curved lips 173 to accommodate the conveyor chain when the latter has been adjusted to the position shown in Fig. 5.

Near the end of the trough opposite the plate 165 brackets 168 are secured to the bottom, Figs. 14 and 16, adjacent the lateral walls of the box and below the same for receiving a shaft 169 which is secured rotatably therein and which carries between the bearing projections of these brackets sprocket wheels 170. These shafts 169, one in each bracket, are located below and slightly forward of the free edge of the bottom plate 147, as shown in Fig. 14, and these shafts, furthermore, rest in bearing brackets 174 which are secured to an extension box 175 constituting the second or pivoted section of the conveyor. The arms of each bearing bracket 168 are arranged with respect to the arms of the companion bracket 174 in a manner analogous to the parts of a hinge the pintle of which is formed by the pertaining sprocket shaft 169. The second section of the conveyor frame is thereby pivotally disposed relatively to the first section thereof.

It also comprises a bottom wall 176 and lateral walls 177. The rear end of this section carries a bearing bracket 178 for the shaft 179 on which the sprockets 180 are mounted.

In order to take up the slack on the conveyor chain the bracket 178 on the second section is spring controlled. A transverse angle 181 is fixed to the lower surface of the bottom wall; rods 182 secured to bracket 178 extend slidably through said transverse bar and helical springs 183 surrounding said rods bear at their rear ends against the transverse angle 181 and at their front ends against washers or collars 184 which are secured to the rods. These compression springs will, therefore, have a tendency to force the support of the sprockets outward, maintaining the conveyor chain in a suitable taut condition and at the same time permitting a yielding movement of said conveyor chain or sprockets if the nature of the load deposited within the conveyor box should render this more or less irregular movement of the chain advisable or necessary or whenever the conveyor chains upon folding the parts into dotted line position, Fig. 5, are to be shortened.

From Figs. 5, 14 and 16 it will, furthermore, be noted that the lower portion of the conveyor chain is engaged by the sprockets 170 held between the hinge brackets 168, 174 by which the two conveyor sections are in movable connection with each other. Owing to this provision of additional sprockets the parallelism between the strands of the conveyor is maintained in all operative conditions of adjustment of one section relative to the other.

The bottom wall 176 of the second conveyor section has a curved lip 185 at the front end, projecting towards the first section to prevent the discharge of the material through the interspace between the two sections and to support the chains when the sections are folded to inoperative condition as shown in dotted lines in Figs. 5 and 14. The upper irons 155 through which the conveyor chains are guided along the bottom wall of the first section are provided with a curved lip 186 extending upwardly to form a guide for those portions of the conveyor chain which pass from one section into the other, enforcing thereby the travel of the chain along the bottom of the two boxes.

For the purpose of adjusting the two conveyor sections relatively to each other the movable section is suspended from a pair of tension members 187, each having one end secured to a pivotal bracket 188 on the lateral walls 177 of the movable section, while the other end is secured fixedly to a drum 189 which is supported at the top end of a bracket 190 projecting upward from the lateral wall 148 and 149 respectively of the stationary section near one end thereof, as shown in Figs. 14 and 15. The two brackets, each constructed in the form of an approximately triangular plate carries near the top a fixture comprising an elongated bearing 191 for the transverse shaft 192, on which the cable drums 189 are mounted. The two bearing brackets 191 are united by a transverse angle bar 193, as shown in Figs. 14 and 15.

On the outer projecting end of the shaft 192 supported in these bearing brackets the two drums 189 are fixedly mounted, and this shaft also carries spaced from one of said drums a chain sprocket 194 over which the chain 195 for adjusting the conveyor frame is placed, as indicated in Fig. 15.

The chain 195 also is trained over a sprocket 196 forming a part of a transmission gearing secured in a suitable position adjacent the engine of the tractor. This train of gears comprises a pinion 197 mounted on a shaft which carries at one end a detachable crank 198. This pinion is in mesh with a larger gear 199 on another shaft carrying at the far end the sprocket 196. This set of gears may be supported in plates or brackets secured to the engine casing or superstructure, as shown in Fig. 4. In order to retain this gearing against accidental rotation, a locking pawl 200 is also supported on the bracket on which the gearing is mounted and is adapted to enter the teeth of the adjacent pinion as indicated in Fig. 5, whereby the chain 195 may be held against accidental displacement. When it is desired to move the conveyor sections into a different relative position the pawl is swung over from locking position, Fig. 5, in which it is held by its own weight, and upon rotation of the crank 198 the train of gears will be actuated and the chain will be moved to rotate the drums 189 on which the suspension cables 187 for the movable conveyor section is wound or unwound.

The machine also comprises means for automatically actuating the clutch on the transverse shaft 96 when the charging bucket 70 has reached a predetermined position near the top end of its path. This automatic clutch control, Figs. 8, 13 and 16 comprises a bracket having downwardly projecting lugs secured by riveting or in some other way to the bottom wall 147 of the stationary conveyor section 146. A bar 202 is slidably supported within the lugs of the bracket 201 and terminates in a deflected hook portion 203. This plunger bar is yieldingly urged into a predetermined position by a spring 204 which surrounds the plunger 202 between the lugs of the bracket 201, said spring resting at one end against the bracket and engaging at the other end a collar 205 fixed to the plunger. This plunger is movably connected at its other end with a link 206 the opposite end of which is in pivotal connection with an arm of a bell crank lever 207 fixed to a transverse shaft rotatably mounted in the bearing bracket 166. The other arm of the bell crank lever is secured to a tension member 208 which is guided over a bearing bracket on the transverse beam 16 on top of the substructure, as shown in Figs. 5, 8 and 9, as for instance by means of a bent tubing 209.

The bucket 70 upon arriving near the top in discharge position will strike the deflected end 203 of the plunger 202 before being tilted to full dumping position and will force this plunger inwardly against the action of the spring 204 so that the parts assume the relation indicated in dotted lines in Fig. 8. The bell crank lever 122 being rocked thereby will bring the cooperating members of the clutch 123, 125 to inoperative position, as indicated in Fig. 9. In this way the drive for the shaft through which the hoisting operation is effected is interrupted and the bucket having arrived in discharge position will automatically return by its own weight and under the influence of the compression spring 204 to the charging position in which it is shown in full lines in Fig. 4.

In Fig. 4 a brake pedal 211 is shown disposed adjacent the driver's seat, this brake pedal being connected by a tension member 212 with a brake lever 213 through which a brake band not shown, may be forced into braking engagement with the drum 214. Upon depression of this treadle 211 the load on the secondary shaft 96 may be increased to such an extent that the rotation of the shaft may be considerably retarded or may be stopped entirely. No details of the brake construction are indicated except as shown in Fig. 9 and any desired brake construction operable by the treadle lever may be used.

The treadle lever 211, as shown in Fig. 4, is secured to a ratchet sector 215 adapted for cooperation with a transverse locking bar 216 located near the rear end of the vehicle and adjacent the driver's seat. A depression of the entire treadle will, therefore, bring this sector into holding engagement with the locking bar and will prevent the return movement of the brake actuating treadle to release position, relieving thereby the operator of the necessity of maintaining his foot on said treadle as soon as he desires to hold the shaft against operation or to retard the movement thereof.

The operation of this device, therefore, is the following.

When it is desired to hoist a bucketful of the material to be carried to the conveyor, the operator advances the tractor to the left, Fig. 4, until the bucket has entered into the heap of material on the ground to a sufficient extent. During this time the secondary shaft 98 is permanently driven, no special clutch being provided for interrupting the movement of this shaft. This shaft transfers the rotary movement by the worm gear transmission 113, 117 to the clutch member 123, which however, is normally in inoperative position so that the transverse jack shaft 96 is not driven thereby. If the operator now desires to hoist the load in the bucket he actuates the clutch control lever 120 in his position, exerting a tension on the rope 121 which passes from this control lever to the clutch shift lever 122, shown in Fig. 9 so that the rotary clutch member is brought into firm frictional engagement with the companion member, the latter being rigidly secured to the transverse shaft. Rotation is thereby transmitted to this transverse shaft in a predetermined direction and the chains 69 are immediately wound on their narrow drums and are guided in this winding movement by the shrouds adjacent the drums. This will wind up the hoisting chains and the bucket will move upward on the curved guides 91 or 128 respectively until it reaches the position indicated approximately in dotted lines in Fig. 8. In reaching the position the bucket tilts and strikes the clutch control plunger 202, displacing the same against the action of the spring longitudinally so as to swing the bell crank lever 207, whereby a tension is exerted on the rope 208. This rope pulls upward the rear end of the clutch shift lever 122 to move the clutch from operative position into the position illustrated in Fig. 9, leaving the bucket in discharge position as long as desired. If the operator now should desire the bucket to be returned to original position he does not actuate the control since the bucket after having discharged its load into the conveyor will under its own weight return to the charging position shown in full lines in Fig. 4. The clutch will thereby be disengaged automatically and the bucket will return to charge position. If the operator should be of the opinion that the bucket still contains remnants of the material which should be delivered into the conveyor, he again pulls on the rope 121 which passes from the clutch control lever in his position to the clutch at the other end, thereby throwing in the clutch and the movement of winding up the chain is repeated.

During this hoisting and lowering movement of the bucket the conveyor chain is permanently driven in the same direction owing to the bevel gear transmission control from the secondary driving shaft, as shown in Fig. 8. In this way an uninterrupted transfer of the load delivered to the conveyor is safeguarded and owing to the construction of the conveyor box itself a discharge or spilling of the load while being carried by the conveyor is avoided.

If then this operation of loading a predetermined vehicle is completed and it is desired to advance the tractor to a different position, it may be advisable to change the relation of the sectors of the conveyor from the relation shown in Fig. 5 in full lines to the relation shown in dotted lines in order to decrease the overall width of the conveyor and particularly in order to decrease the weight or strain on the pivot joints by means of which these sections are interconnected. The operator will then throw out the holding pawl from engagement with the actuating pinion and he may manipulate the crank to effect the return movement of this conveyor section to a position near the framework of the tractor.

I claim:

1. In a device of the character described, the combination of a tractor having an engine and a chassis; a hoisting device, an engine shaft, a secondary shaft permanently driven by said engine shaft, a worm gear transmission permanently driven by said secondary shaft, a transmission shaft operatively connected with the hoisting device, and operator controlled means for selectively connecting and disconnecting said worm gear transmission to and from said transmission shaft respectively.

2. In a device of the character described, the combination of a tractor having an engine, a load receiving element, a charging device for said load receiving element, an engine shaft, a secondary shaft in permanent driving connection with said engine shaft, a transmission shaft controlling said charging device, a worm transmission interposed between said shafts, a clutch, and operator controlled means for actuating the clutch interposed between said worm transmission and the transmission shaft.

3. In a device of the character described, the combination of a tractor having an engine, a conveyor, engine operated means for permanently driving the conveyor in a predetermined direction, a charging bucket, a spring controlled plunger projecting into the path of the charging bucket, a shaft, a clutch thereon, means for manually moving said clutch to operative position, and means connected with the spring controlled plunger for moving said clutch to inoperative position.

4. In a device of the character described, the combination of a tractor with an engine, a charging bucket, a countershaft operable by the engine of the tractor, means controlled by the countershaft for hoisting the charging bucket from load receiving to load discharging position, a hand operated clutch on said countershaft, and a spring controlled device in the path of the charging bucket adjacent its discharge position, said spring controlled device being connected with the hand operated clutch and being adapted to effect disconnection of said countershaft from the engine.

5. A device of the character described, comprising in combination a tractor with an engine, a permanently driven shaft, a worm gear actuated by said permanently driven shaft and mounted on a shaft supported above the tractor and the engine, a charging bucket actuated from said last named shaft, a clutch on said last named shaft, and means under control of the bucket for actuating said clutch by the bucket when the latter has reached a determined position, said clutch actuating device under control of the bucket being located on the opposite side of said last named shaft from the worm gear.

6. In a device of the character described, the combination of a tractor having an engine, a transmission gearing interposed between the shaft of the engine, and a transmission shaft extending substantially vertically from the transmission gearing upward, said transmission gearing being enclosed in an oil tight casing near the lower end of said transmission shaft, a worm gear transmission at the top end of said transmission shaft for driving a countershaft, said worm gear transmission being also enclosed in an oil tight casing, and means operated by the countershaft for actuating a bucket from the engine of the tractor.

7. In a device of the character described, the combination of a tractor having an engine, a transmission gearing driven by the shaft of the engine, a transmission shaft in permanent connection with said transmission gearing and extending substantially vertically, a super-structure on the tractor, a countershaft supported at the top of said super-structure, a worm gearing between said transmission shaft and the countershaft, a charging bucket operable from the countershaft, a traveling conveyor in a position to receive the load from the bucket and gearing between the ends of the transmission shaft for imparting movement to the conveyor.

8. In a device of the character described, the combination of a tractor having an engine, a transmission driven by the shaft of the engine, a transmission shaft extending substantially in vertical direction and having at its lower end a driving connection with said transmission and having at its upper end a worm, a countershaft with an axis at a right angle to that of the transmission shaft and having a worm gear in permanent engagement with said worm, a charging bucket operated from the countershaft, a clutch on the countershaft, a manually operable lever for moving said clutch to operative and release position, a plunger projecting into the path of the charging bucket, a bell crank lever associated with the plunger and a flexible connection interposed between said bell crank lever and said manually operated lever for effecting displacement of the clutch when the bucket has reached a predetermined position.

9. In a device of the character described, the combination of a tractor and an engine, a transmission driven by the engine shaft, a transmission shaft extending substantially in vertical direction and having its lower end in driving connection with said transmission, a worm gear transmission at the upper end of said transmission shaft, a super-structure, a countershaft extending transversely of the transmission shaft and supported by said super-structure, a conveyor frame carried by said super-structure, means on said transmission shaft for actuating a conveyor on said frame, said conveyor being driven from the transmission shaft, manually operable means for establishing driving connection between said transmission shaft and said countershaft, and automatically operable means under control of the bucket driven by the countershaft for interrupting the driving connection between said countershaft and said transmission shaft, said automatically operable means being supported on the frame of the conveyor.

In testimony whereof I affix my signature at 114 Grand Avenue, Milwaukee, Wisconsin.

GEORGE MANIERRE,